(12) United States Patent
Potter

(10) Patent No.: US 8,096,219 B2
(45) Date of Patent: Jan. 17, 2012

(54) APPARATUS FOR CONVEYING A WORKPIECE TO MAKE A STRAIGHT-LINE CUT

(76) Inventor: Christian Jason Potter, Liberty Township, OH (US)

( * ) Notice: Subject to any disclaimer, the term of this patent is extended or adjusted under 35 U.S.C. 154(b) by 370 days.

(21) Appl. No.: 12/586,409

(22) Filed: Sep. 23, 2009

(65) Prior Publication Data

US 2011/0067541 A1    Mar. 24, 2011

(51) Int. Cl.
*B27B 27/02* (2006.01)
*B27B 25/10* (2006.01)

(52) U.S. Cl. ......... 83/409; 83/438; 83/477.2; 83/435.11

(58) Field of Classification Search .... 83/435.1–435.15, 83/468–468.4, 468.7, 446, 485, 437.1, 409, 83/734.1, 438, 477.2, 415, 745; 144/286.1
See application file for complete search history.

(56) References Cited

U.S. PATENT DOCUMENTS

| | | | |
|---|---|---|---|
| 2,032,976 A | 3/1936 | Carter | |
| 2,895,513 A * | 7/1959 | Cowley | 83/435.14 |
| 3,587,680 A | 6/1971 | Bishop | |
| 4,002,329 A | 1/1977 | Petrowski | |
| 4,164,882 A * | 8/1979 | Mericle | 83/409 |
| 4,292,870 A * | 10/1981 | Mericle | 83/471.2 |
| 4,464,962 A * | 8/1984 | Myhre | 83/425 |
| 4,693,156 A * | 9/1987 | Olvera | 83/422 |
| 4,974,306 A * | 12/1990 | Cole et al. | 29/434 |
| 5,113,734 A | 5/1992 | Mahler | |
| 5,275,074 A | 1/1994 | Taylor | |
| 5,379,669 A * | 1/1995 | Roedig | 83/421 |
| 5,402,701 A * | 4/1995 | Ingram | 83/421 |
| 5,823,084 A | 10/1998 | Ramey | |
| 5,918,520 A * | 7/1999 | Whitcomb | 83/435.27 |
| 5,941,514 A * | 8/1999 | Burcaw | 269/37 |
| 5,964,041 A * | 10/1999 | Daniel | 33/403 |
| 6,062,122 A * | 5/2000 | Niemczyk | 83/745 |
| 6,164,176 A | 12/2000 | Larsson | |
| 6,237,457 B1 * | 5/2001 | Taylor | 83/435.15 |
| 6,499,224 B1 * | 12/2002 | Asick | 33/628 |
| 6,945,150 B2 * | 9/2005 | Chang | 83/435.12 |
| 6,959,632 B2 * | 11/2005 | Lee | 83/435.14 |
| 7,000,519 B1 | 2/2006 | Weinstein | |
| 7,021,305 B2 * | 4/2006 | Lee | 125/13.01 |
| 7,127,976 B1 | 10/2006 | Fitzsimmons | |

(Continued)

OTHER PUBLICATIONS

Nixon, John W. "Super Sled—Crosscut and Miter Sled." Eagle Lake Woodworking. Feb. 21, 2009. Web. Aug. 14, 2010 <http://www.eaglelakewoodworking.com>.
Taylor Design Group, Inc. (Incra Precision Tools). Miter Express Product. Web. Aug. 14, 2010 <http://www.incra.com>.

(Continued)

*Primary Examiner* — Laura M. Lee

(57) ABSTRACT

This invention is a work carriage used with a cutting tool's table surface to make straight-line cuts. The device responds to the need for cutting a wide range of angles and positions on workpieces of different sizes and shapes more accurately, consistently, and safely. The invention consists of a main support which rides on a slide attached to the table surface's guide slot using a wedging action to fill the width of the guide slot. Clamps hold the workpiece to the main support along a t-shaped channel. Once set up, the main support moves precisely along the slide parallel to the guide slot and cutting plane. The main support also has threaded holes to attach workpiece stops and a fence, as needed, for making consistent cuts. A secondary support is used to provide the necessary support with a larger workpiece that has a center of mass beyond the main support.

8 Claims, 12 Drawing Sheets

U.S. PATENT DOCUMENTS 7,444,945 B2 * 11/2008 Wang .............................. 108/20
2008/0083311 A1 4/2008 Wang
2008/0284081 A1 * 11/2008 Smith ............................. 269/74
2009/0044677 A1 * 2/2009 Wilson et al. ................... 83/824

OTHER PUBLICATIONS

Rockler Companies, Inc. Item No. 21597, Taper/Straight Line Jig. Web. Aug. 14, 2010 <http://www.rockler.com>.

* cited by examiner

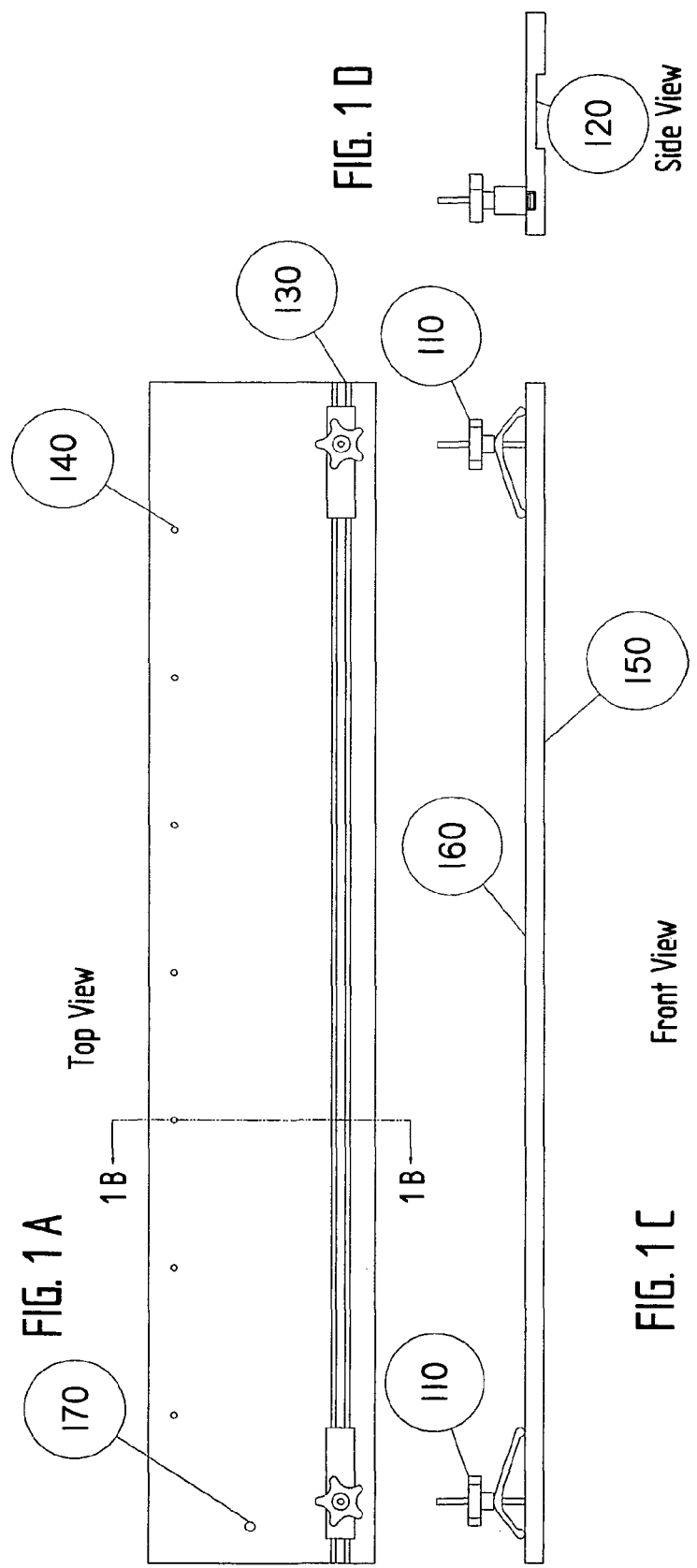

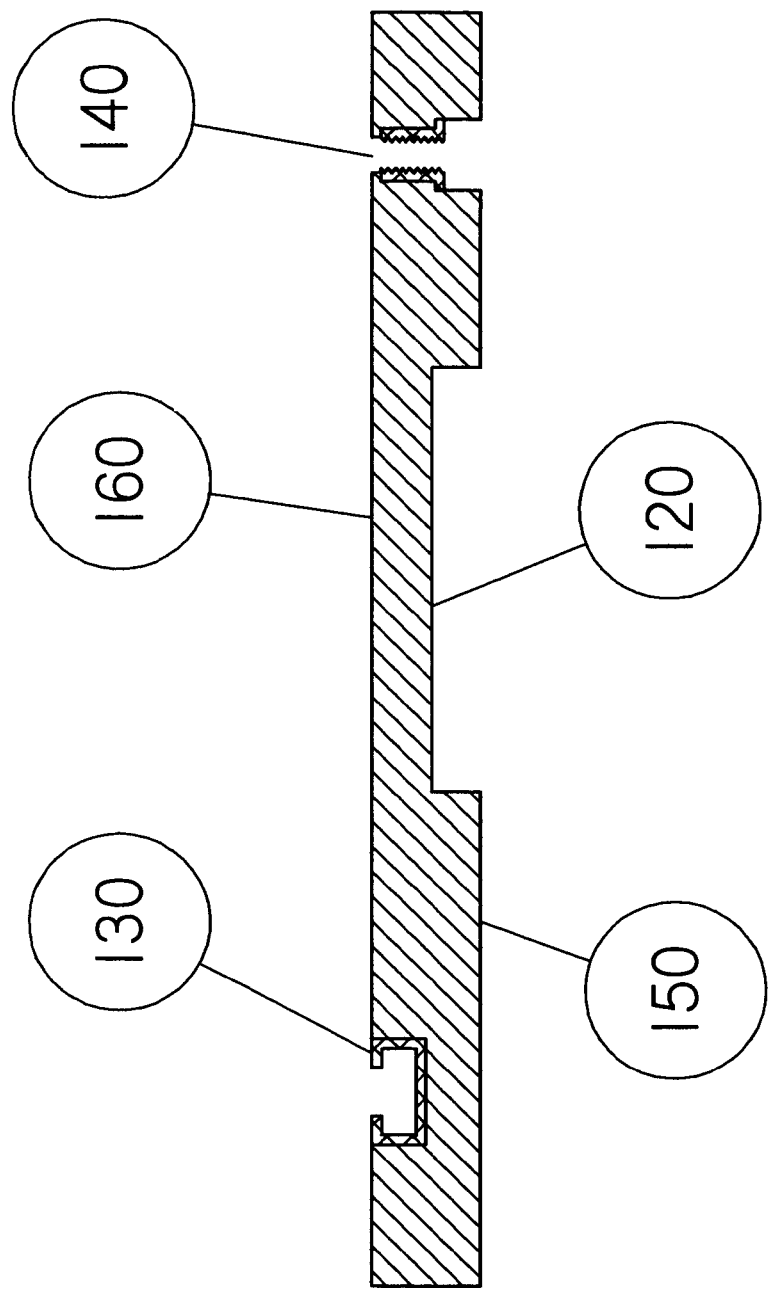

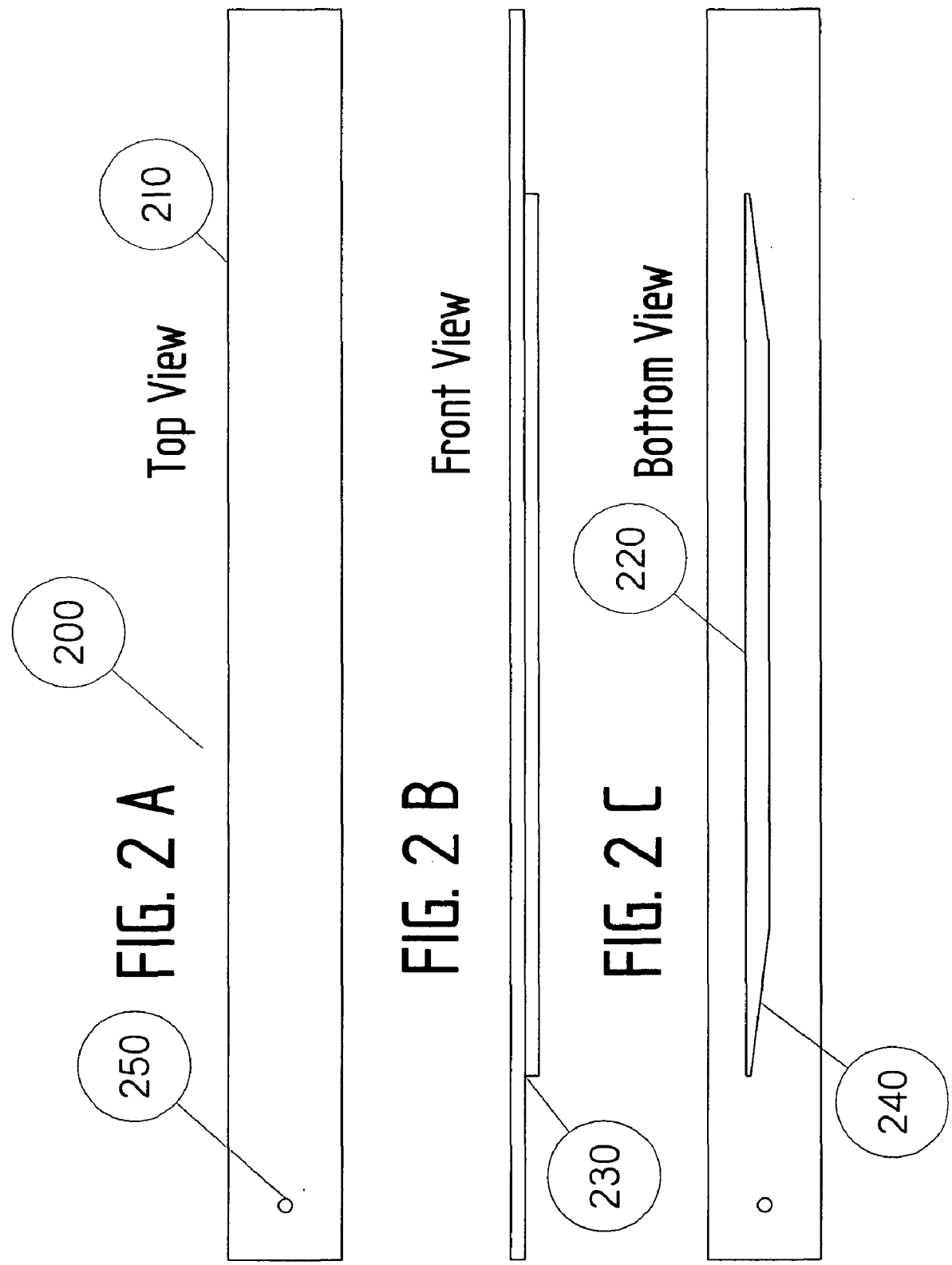

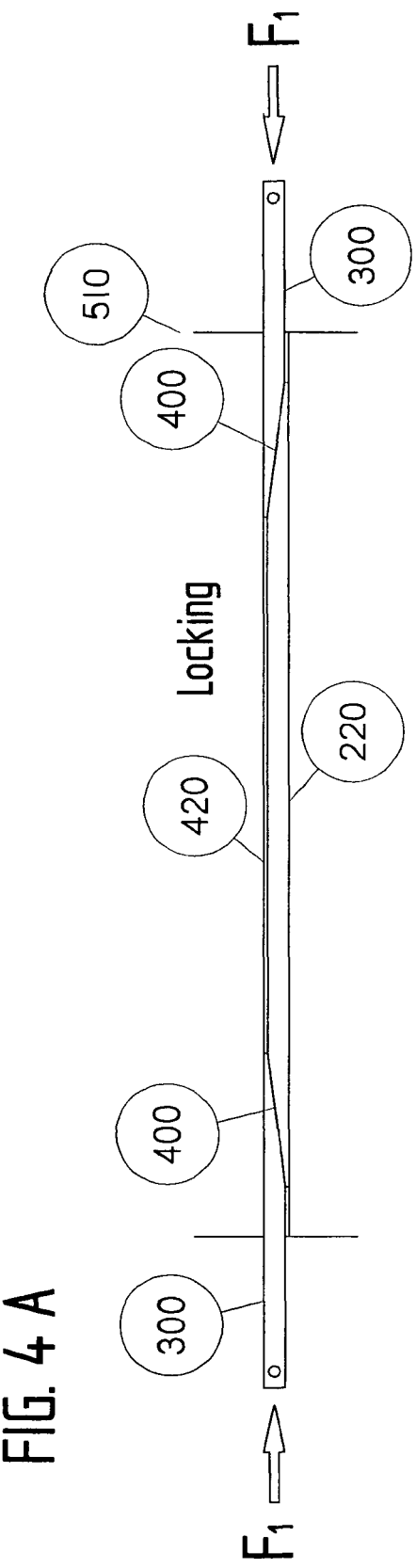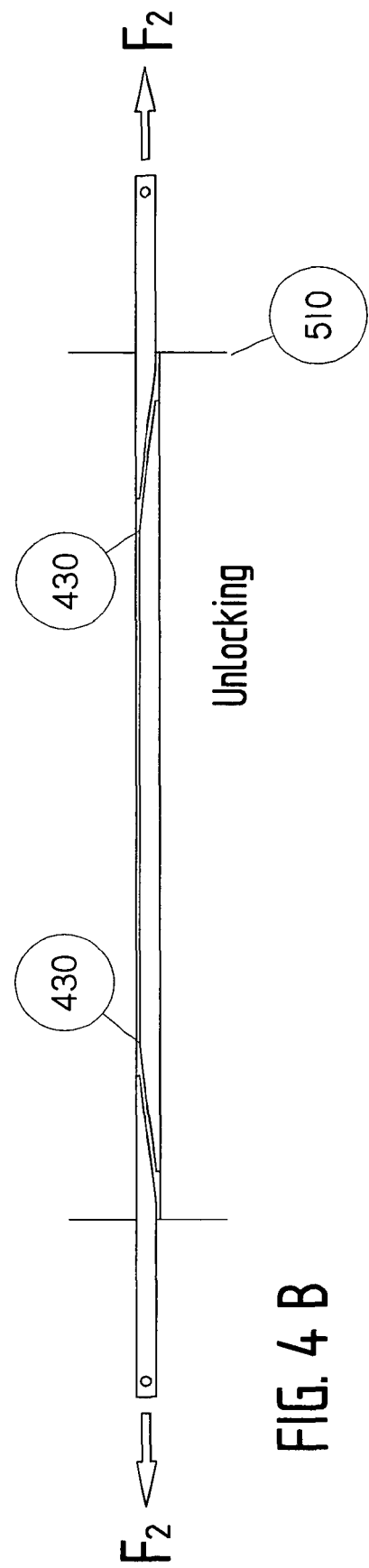
FIG. 4 A    FIG. 4 B

Top View

FIG. 10    Top View

APPARATUS FOR CONVEYING A WORKPIECE TO MAKE A STRAIGHT-LINE CUT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

This invention relates generally to work carriages which guide a workpiece for making a precise, straight-line cut and more particularly for workpieces which can have a rectangular or irregular shape and a total size which can be relatively small or large compared to the work carriage.

BACKGROUND OF THE INVENTION

In the field of this invention, there are several factors which are important:
1. Precision of the cut with respect to position, angle, and straightness
2. Quality of the cut such that there is minimal tear out (splintering) of the workpiece
3. Ability to cut a wide range of angles from parallel rip cuts to 90 degree cross cuts
4. Ability to cut workpieces of different sizes and shapes
5. Make repetitive cuts to a series of identical workpieces with consistent accuracy
6. Hold and support the workpiece solidly without damaging it
7. Safe to use and complements other safety devices normally used with the cutting tool
8. Easy to use with a quick set-up and tear-down time
9. Reasonable size, weight, and shape for handling and storing
10. Competitive cost to manufacture the device To varying degrees, the prior art has taken on many different configurations to address these needs. The current state of technology of the known configurations, however, has focused on subsets of these important elements. Opportunities exist to improve upon the prior art to better answer these needs. Given the nature and function of this invention, it is important to look at prior art that encompasses taper cutting, straight-line cutting, and the means of how these are achieved.

U.S. Pat. No. 2,032,976 issued to Carter describes an adjustable taper ripping jig which uses two arms hinged together on one end and an adjusting and locking mechanism on the other end to set an angle. The arm that guides the workpiece also has an adjustable end stop. The jig is used in conjunction with a standard fence accessory which is parallel to the cutting plane on the table surface of the cutting tool. The fact that variations of this design are still prevalent in the marketplace is a testament to its utility and value; however, it does have limitations. Unfortunately, an operator using this jig must put pressure from the side and top to keep the workpiece against the jig and table top, and the jig against the fence. This potentially places the operator in a dangerous position while cutting. It also makes it challenging to produce a quality cut. The range of angles that can be cut and the size and shape of the work pieces that can be cut are both limitations as well. It can also be difficult to determine exactly where the taper cut will be along the workpiece.

U.S. Pat. No. 4,002,329 issued to Petrowski describes a different guide device for making taper cuts. This configuration uses a guide member which slides along the guide slot of a cutting tool's table surface. A workpiece holder is attached to the guide member using adjustable connections which can be fixed in place to create an angle. The usage of the guide slot does isolate the guide member from significant lateral movement. Unfortunately, the way in which the guide slot is used limits the width of workpiece that can be cut. It also limits the range of angle that can be cut. No precise means of fitting the guide member to the exact size of the guide slot is specified. Without a precise fit, the quality of the cut on the workpiece will be compromised. Furthermore, if a runoff table is used in conjunction with the cutting tool's table surface, this require a longer than usual slot in the surface of the supporting table to allow the device to cut longer boards. Similar to the U.S. Pat. No. 2,032,976 design, this device also lacks a means of positively holding the workpiece to the workpiece holder. Additionally, both designs only have an end stop. This requires the operator to apply side pressure to the workpiece during cutting as discussed previously.

U.S. Pat. No. 4,002,329 issued to Larsson describes a woodworking guide accessory for making taper cuts by using a design similar to the U.S. Pat. No. 2,032,976 design. The most significant improvement with Larsson's configuration is that the workpiece is positively and precisely clamped to the device. It also has handles which allows the operator to more safely guide the devise and the workpiece during cutting. However, this design has some of the same limitation of the two previous designs. Once again the range of angle that can be cut in the workpiece is constrained. Additionally, since the clamps elevate the workpiece from the cutting tool's table surface, there is more opportunity for the workpiece to experience tear-out during the cutting process. Furthermore, the materials and component parts required to manufacture an embodiment of the device does increase its cost.

U.S. Pat. No. 4,164,882 issued to Mericle is a guide apparatus which is designed to make straight (rip) cuts in a workpiece which can have an irregular shape excluding the ends. This design uses guide member which can ride in the cutting tool's table surface guide slot or along a moveable guide slot that clamps to the table surface. The workpiece is held in place to the device by utilizing "conical point members mounted upon spindles" which attach to the ends. If the device is used with one of the table surface guide slots, it will have the same challenges as discussed previously regarding the quality of the cut if the guide is not precisely fit to the table slot and it may interfere with a runoff table when making long cuts. If the adjustable guide slot is utilized, the precision of the fit can be improved greatly. However, the workpiece will then be elevated from the cutting tool's table surface which can reduce the quality of the cut as discussed previously. Furthermore, given the method of fixing the workpiece to the device, the workpiece will be damaged on the ends. This limits the device to cutting workpieces with unfinished ends which must be subsequently trimmed if the appearance of the workpiece is important.

U.S. Pat. No. 5,113,734 issued to Mahler devises another guide configuration to cut straight (rip) cuts in a work piece that has two uneven edges. This device is used in conjunction with a fence accessory on the table surface of the cutting tool. The design uses two push stops along the side to support the uneven edge and pin points on one end to help secure the end to the device. The main limitations of this design are the need to place pressure to the side of the workpiece and guide. The pin points also create damage to the workpiece end.

U.S. Pat. No. 5,823,084 issued to Ramey for a guide configuration to produce straight line cuts in a workpiece. The device uses a board with toggle clamps to secure the workpiece. A second board is fixed over the cutting tool to act as a guide for the board with the workpiece. A fence accessory can then be position to guide the board with the workpiece from the other side. There are limitations with this design. The maximum width of the workpiece that can be cut is dependent on the fixed width of the device. When cutting workpieces of different thicknesses, the toggle clamps must be adjusted each time. Also, depending on the fixed spacing of the toggle clamps, the operator may be unable to clamp a short length workpiece.

U.S. Pat. No. 5,918,520 issued to Whitcomb is another version of a straight line saw guide. This device is similar to the previous design by Ramey; except, it provides a width adjustment. However, given the positioning of the toggle clamps, this design is less tolerable of irregularly shaped workpieces. Since it uses one of the table surface guide slots, it will have the same challenges as discussed with U.S. Pat. No. 4,164,882. This may impact the quality of the cut if the guide is not precisely fit to the table slot, and it may interfere with a runoff table if one is used with the cutting tool. As mentioned with the Ramsey design, the toggle clamps must also be adjusted for different workpiece thicknesses.

U.S. Pat. No. 7,000,519 issued to Weinstein describes a clamping device that is used in conjunction with a reference board and the workpiece to provide guidance in making straight line cuts. It also has a shim arm to help support the workpiece to compensate for the lower clamp surface thickness. This design provides a lower cost alternative compared to the other designs for cutting straight line cuts. The two main limitations are the potential cut quality issues from the work piece being elevated from the cutting tool's table surface and the inability to cut more irregularly shaped workpieces.

U.S. Pat. No. 5,275,074 issued to Taylor describes a slide device for the guide member slot of a cutting tool's table surface. This design utilizes wedges that will expand the sides of the slide to fill the gap with the slot when a compressive force is applied from the top and bottom using a machine screw. U.S. Patent Application Publication US2008/0083311 A1 describes an adjustable guide by inventor Wang. In this design, a wedging action is also used such that a compressive force on the ends of the stacked guide member pieces expands the width of the guide to match the slot width. Both designs provide an adequate means of more precisely matching the guide member width to the slot width. However, neither guide member design is particularly suitable for locking and unlocking the guide to a cutting tool's table surface guide slot while the guide is attached to a larger jig. Also, depending on the materials used and the method of manufacturing, both designs can be expensive to produce.

With the limitations highlighted in the current art, there is a definite need for a better design configuration which provides precise and quality cuts over a larger range of workpiece sizes and shapes with a cost-effective construction.

BRIEF SUMMARY OF THE INVENTION

In general, this invention consists of a guiding device for making precise, straight-line cuts where the workpiece can assume a plurality of angular and translational positions. This invention seeks to resolve the problems described with the prior art.

The configuration of this device is designed to achieve several objectives. One objective of the invention is to improve the accuracy and quality of the cut without damaging the workpiece. Another objective is to increase the range of workpiece sizes, shapes, and orientations that can be cut. A further objective is to provide an ease of usage and handling that can be operated in a safe manner. Yet, another objective is to achieve all of these previous objectives in a device that is cost-effective to manufacture.

The configuration of this invention consists of a main planar support component with a long rectangular shape. This main support rides on top of a cutting tool's table surface parallel to the cutting plane. A slide component precisely fits into a channel which is present in the bottom surface of the main support. The slide component is temporarily affixed to the table surface by utilizing a guide slot which is present on a conventional cutting tool's table surface. This is achieved by using a bar which is tapered on both ends. It locks into place by pressing two mating tapered parts together with the tapered bar. The setup assembly is held together by the wedging action of the tapered ends. This bar is permanently attached to the bottom surface of the slide component. Once attached, the main support can move precisely along the slide component. On the surface of the main support, there is a narrow channel which has a conventional t-shaped type track assembled to it. This track, which runs along the entire length of the support, provides a means for clamping a workpiece onto the main support for cutting. Depending on the desired manufacturing method of the support component, the t-shaped track could alternatively be achieved by milling the support component directly thus eliminating the need to affix a separate t-track component to the support component. A secondary support, which is narrower than the main support, has a similar construction except it does not have a channel on its bottom surface. This secondary support is used when cutting wide workpieces. It can be freely moved and clamped into position on the workpiece to provide support during cutting. For narrower workpieces, this support does not need to be used. The main support also has a series of threaded holes which allows workpiece stops to be positioned and set in place using commonly available accessory components. This allows a means of making accurate, repetitive cuts on a series of same size and shape workpieces. Given the flexibility of this invention, a wide range of workpieces of different sizes and shapes can be cut accurately, consistently, and safely.

BRIEF DESCRIPTION OF THE DRAWINGS

The invention will be fully explained by the detailed description and claims with reference to the accompanying drawings wherein the figures depict the following:

FIGS. 1A, 1C, and 1D are, respectively, the top view, front view, and side view of the main support assembly.

FIG. 1B is a cross-sectional view of the main support assembly.

FIGS. 2A, 2B, and 2C are, respectively, the top view, front view, and bottom view of the slide component.

FIGS. 4A and 4B, respectively, illustrate the locking action and unlocking action of the bar locking components with the slide component in a guide slot of a cutting tool's table surface.

DETAILED DESCRIPTION OF THE INVENTION

Figure 3:
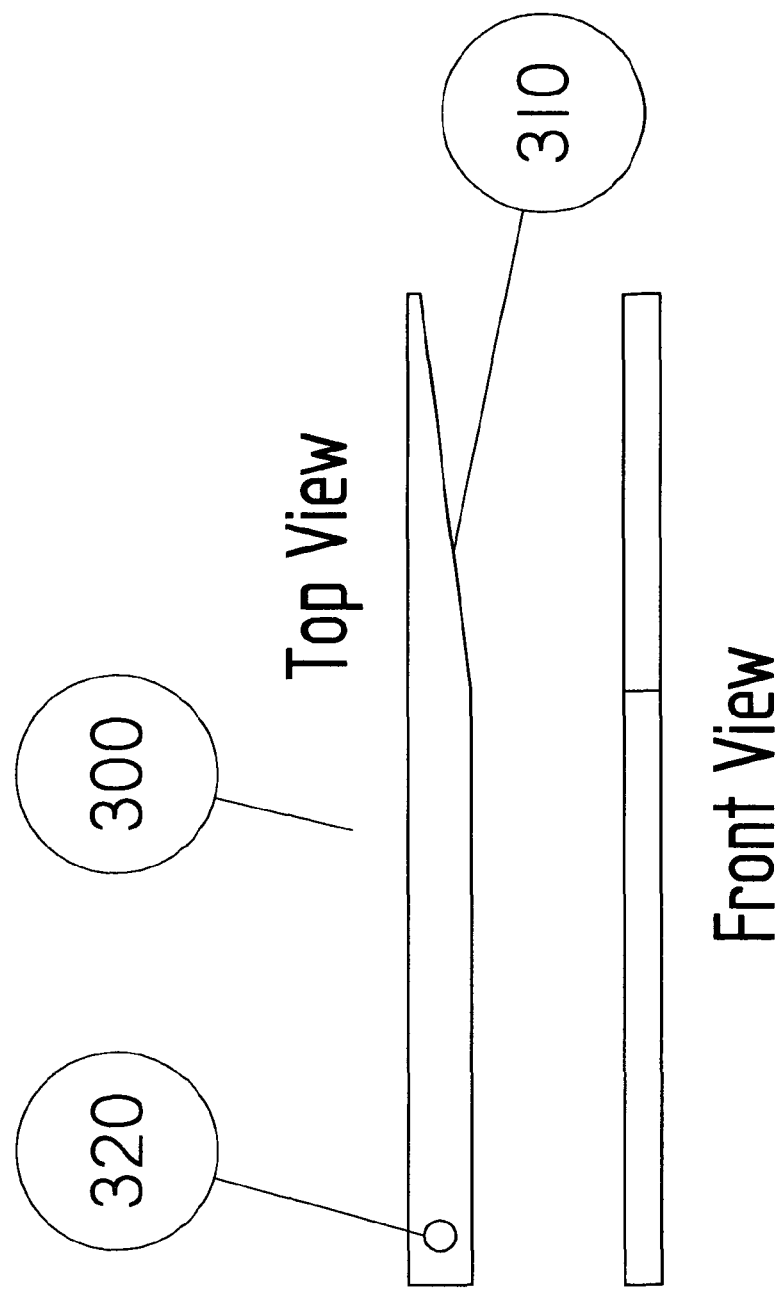
FIGS. 3A and 3B are, respectively, the top view and side view of the bar locking components.

The following detailed description sets forth the preferred embodiment of the present invention with reference to the accompanying drawings. The description provides sufficient detail to enable any person of ordinary skill in the art to construct and practice the invention. This invention is not limited by the preferred embodiment. Other embodiments can be considered that do not depart from the spirit and scope of the invention. The present invention is solely defined by the established claims. The invention responds to the need for cutting a straight-line in a plurality of angles and positions on a wide range of workpieces of different sizes and shapes more accurately, consistently, and safely.

FIGS. 1A-6C illustrate the components and the assembled state of the preferred embodiment of the present invention. FIGS. 7-11 illustrate examples of potential, different straight-line cuts that can be made to workpieces of different sizes and shapes; however, the invention is not limited to only making these specific cuts.

FIGS. 1A, 1C, and 1D illustrate the main support component 100 with a top surface 160 and a bottom surface 150. In usage of the main component 100, the bottom surface 150 would be positioned on top of a cutting tool's table surface 510 of FIG. 5, and a workpiece would be placed on the top surface 160. The clamps 110 connect to the main support component 100 using the t-shaped track (or channel) 130 on the top surface 160. The preferred embodiment of the invention is illustrated with t-shaped tracks; however, the desired functionality can also be achieved from a t-shaped channel directly cut into the top surface 160 of the main component 100. The clamps 110 are any one of the clamps that are commonly available in the market for usage with a t-shaped track (or channel). In a typical clamp design, the clamping action is generated by turning a threaded knob along a t-shaped bolt which presses the body of the clamp onto the top surface of the workpiece. A compressive force in generated from this clamping action from the advancing knob and clamp body along the bolt which squeezes the workpiece between the clamp body and the top surface 160 of the main support component 100. Note that the t-shaped bolt of each clamp 110 is supported from the bottom by the t-shaped track 130. The FIGS. 1C and 1D, front and side views, illustrate how a typical clamp 110 attaches to the t-shaped track 130 of main component 100. Given that the t-shaped track 130 extends the entire length of the main support 100, the clamps 110 can be moved along this length to clamp workpieces of varying sizes. This provides considerable flexibility when using the device. The storage hole 170 located on the left side of the top surface 160 of the main component 100 is present to provide a means for hanging the tool up for storage when an operator is not using the tool. An appropriately sized diameter peg or hook can fit through the hole 170 to allow the tool to hang for storage. Threaded holes 140 are arranged in preferably a plurality of number along the back side of top surface 160 of the main component 100 to allow adjustable workpiece stop accessories to be attached to the tool. Using workpiece stops provides a means of setting up the tool to make consistent cuts to a series of identical workpieces. Potential arrangement of workpiece stop accessories will be described in more depth later in the section of the detailed description corresponding to FIG. 7. As shown in the cross-sectional view, FIG. 1B, of the preferred embodiment of threaded hole 140, the hole can be constructed by affixing a threaded insert (or directly threading the hole) where a counterbored hole is also created to allow a bolt to be threaded up from the bottom without the bolt's head interfering with the bottom surface 150. A bolt (or threaded rod) can also be threaded down through the top surface 160. This allows the operator flexibility to use a variety of accessories with the tool. On the bottom surface 150, there is also a slide channel 120 which is cut into the main support component 100. This channel matches together with the slide component 200, FIG. 2A, to allow the main component 100 to move in a restricted, linear motion parallel to the longitudinal axis of the main component (along its length). Maintaining tight tolerances on the dimensions, linearity, and fit of this slide channel 120 with the corresponding slide component 200 are critical to eliminate unwanted movement of the device which can adversely affect the precision and quality of the cut in a workpiece.

In FIGS. 2A, 2B, and 2C, the slide component 200 is constructed of two parts: a top slide part 210, which matches with the slide channel 120 of the main component 100, and a bottom bar part 220 which is designed to be slightly smaller in width to fit into a standard guide slot on a cutting tool's table surface such as a miter slot on a table saw. This allows the smaller bottom bar to accommodate variations in width of different guide slots. These two parts could be constructed from cutting one piece of material. However, they are shown here as two parts joined together since this is a lower cost option for manufacturing the device, and it allows for the bottom bar to be affixed at a chosen position laterally. Depending on the chosen materials and manufacturing method, the two parts can be joined together 230 with an adhesive, affixed with suitable fasteners, or through other means. The top slide part 210 is sized to fit and completely fill the cross-sectional space of the slide channel 120 of component 100. It is essential that the thickness of part 210 does not extend beyond the bottom surface of 150. This is important since the bottom surface 150 must contact and ride along the cutting tool's table surface 510 of FIG. 5 without creating a gap by an excessively thick slide component part 210. Furthermore, the thickness of the bar component 220 must be less than the standard depth of the cutting tool's table surface guide slot 420 of FIG. 4A. This will ensure that the top part 210 rest flatly on the cutting tool's table surface 510. When affixed, parts 210 and 220 must be positioned such that their longitudinal axes are precisely parallel. This is also critical such that the overall tool, when operated, will have a motion precisely parallel to the guide slot and the cutting plane of the cutting tool. The chosen positioning of part 220 along the width of 210 can be done to accommodate guide slots 420 which may vary in perpendicular distance from the cutting plane of different cutting tools. Variation is this distance is also accommodated by the width of the main component 100 which is cut to a zero clearance gap when the tool is first assembled and set up to use. The bar part 220 has a tapered shape 240 on both ends. This tapered shape matches with the tapered shape 310 of the bar locking wedges 300 in FIGS. 3A and 3B. These matching components provide the means for locking the overall slide component 200 to the table surface 510. Storage hole 250 on the left side of slide part 210 matches up with storage hole 170 on component 100 to provide a means of storing both components together in a manner described previously. For smooth operation and reduced wear, a suitable lubricant (that works with the chosen construction materials) is applied along the mating surfaces of the top slide part 210 and the slide channel 120.

In FIGS. 3A and 3B, the bar locking wedges 300 have the same cross-sectional dimensions as the bar part 220. Parts 300, however, have a shorter length with only one tapered end 310. The tapers fit together with bar 220 as will be discussed in detail later with FIG. 4. The bar locking wedges 300, also have a hole 320 present on the non-tapered end which can be used to facilitate removing the part from an assembled state, which will also be discussed with FIGS. 4A and 4B, and to provide a means of collecting and storing the components when the device is not being used.

In FIGS. 4A and 4B, the locking action used to set up the tool for usage and the later unlocking action used to disassemble the tool for tear-down and storage are illustrated. The bar part 220, shown separately from the slide component top part 210 for simplicity, is inserted into the cutting tool's guide slot 420. Once the bar component 220 is positioned as desired, the bar locking wedges are inserted with the tapered edges matching the tapered ends of component 220. A wedging action 400 occurs when a force $F_1$ from each end is applied to each part 300. The operator can achieve this by holding the overall slide component 200 flat against the table surface 510 while pushing in each part 300, one at a time. The bar component 220 is locked in place as the collective width of the two tapered ends, 310 and 240, increases from the components sliding along each other creating a compressive pressure along the sides of the guide slot 420. The frictional force of the components 220 and 300 pressed against the guide slot 420 sides locks the overall slide component in place for usage of the tool. Sufficient force must be used to positively lock the slide components in place. This is important so that is doesn't work loose and cause a potential safety problem. After using the tool, the bar component 220 can be unlocked by applying a force F2, in an opposite direction, to each of the bar locking components 300. To assist the operator in removing the bar locking components 300, the hole 320 can be used in conjunction with another tool to tap (or pull) the components loose. This action reduces the total width of the two tapered ends, 310 and 240, compared to the width of the guide slot 240, and it creates a gap 430 which allows the overall slide component 200 to be disassembled.

Figure 5:
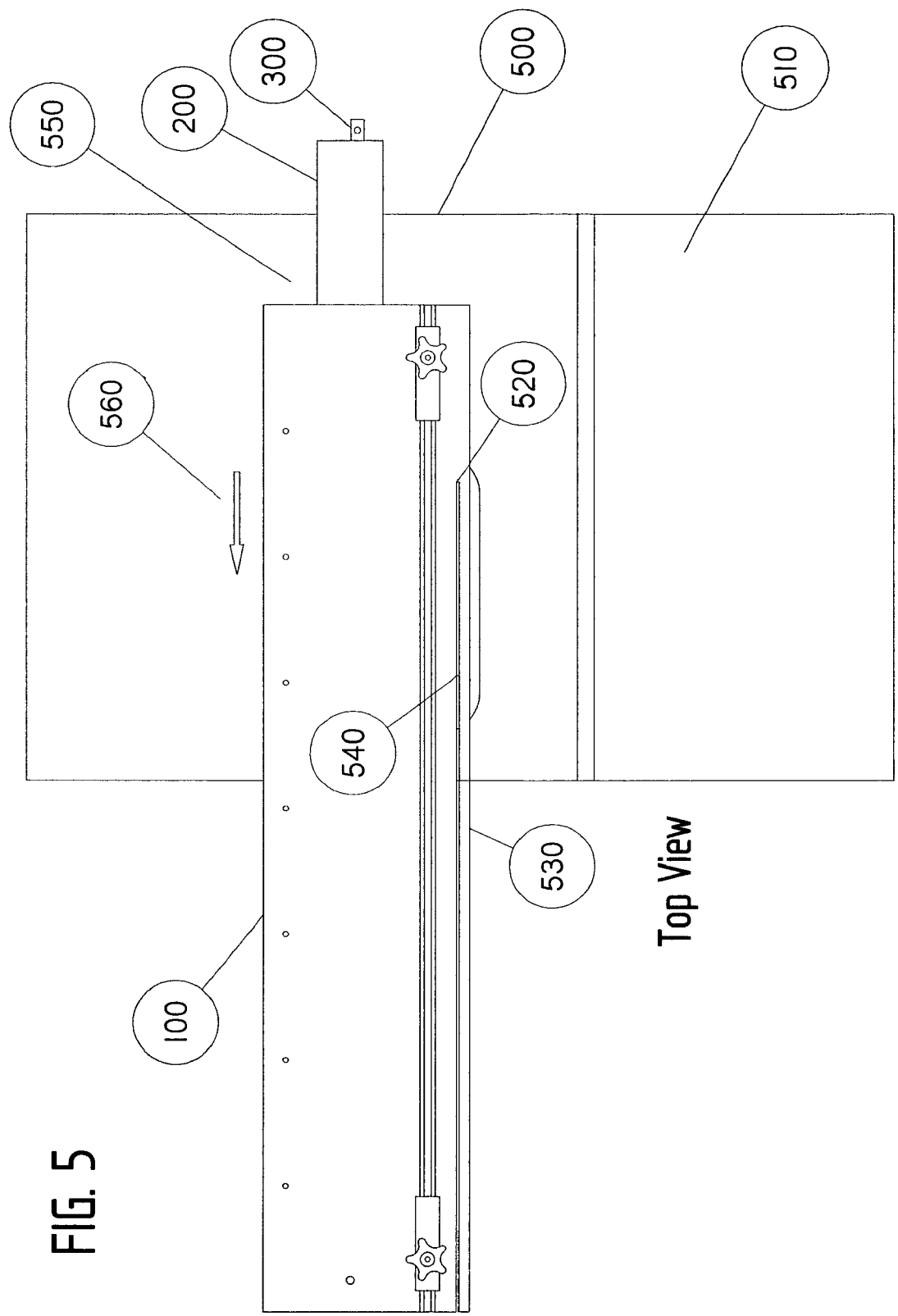
FIG. 5 illustrates the operation of a preferred embodiment of the invention on a conventional table saw.
Figure 6:
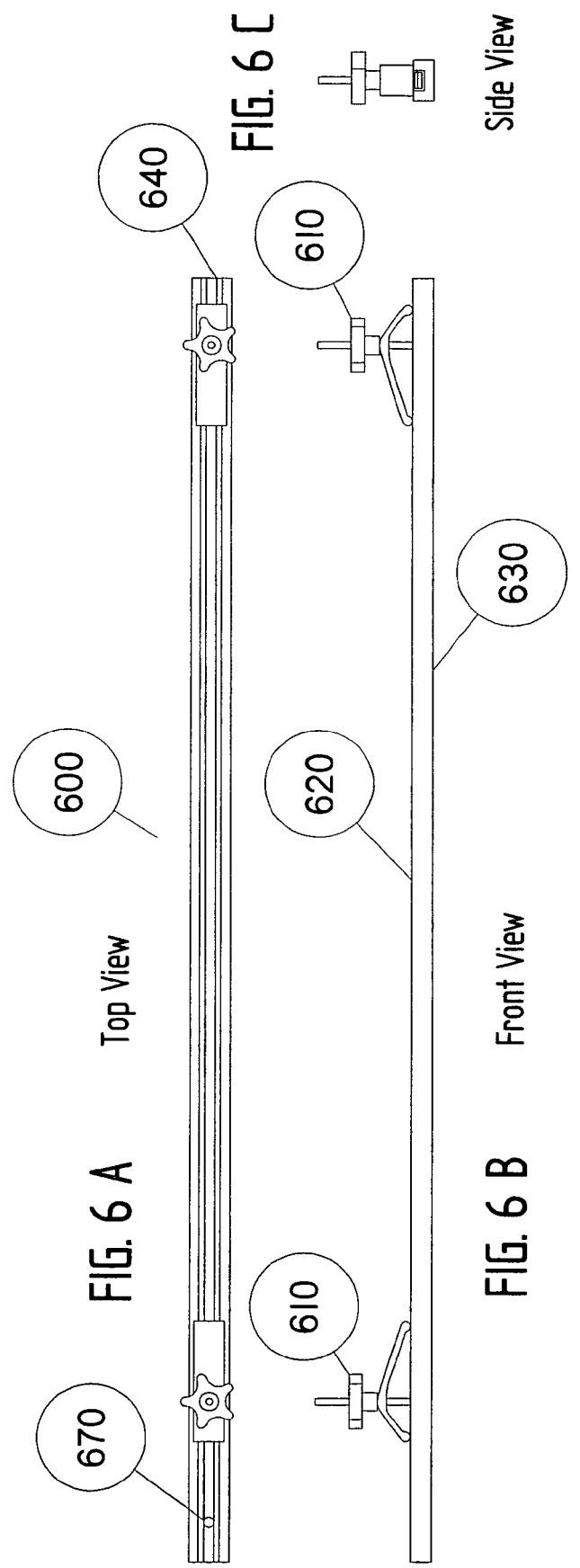
FIGS. 6A, 6B, and 6C are, respectively, the top view, front view, and side view of the secondary support assembly.

In FIG. 5, the main tool 550 (components 100, 200, and 300 used together) of the preferred embodiment of the invention is set up on a table surface 510 of a conventional table saw 500. This figure illustrates how the main support component 100 of the tool is cut to a zero clearance gap 540 by the saw blade 520 trimming off the excess material 530. Once this initial cut is complete the tool is ready to be used for cutting a workpiece. The direction of movement 560 of the tool is a linear motion which is parallel to the cutting plane of the saw blade 520. To maintain a precise and accurate cut, it is essential that the cutting tool is set up where the guide slot 420 longitudinal axis and the saw blade 520 cutting plane are precisely parallel. It is clear by someone skilled in the art that the design of the invention can be used in conjunction with many of the typical cutting tool guards. When an operator uses the main tool 550, it is pushed along the table surface similar to rip cutting a board with some pressure applied to the top of the workpiece but without the need to constrain the workpiece from lateral movement.

Figure 11:
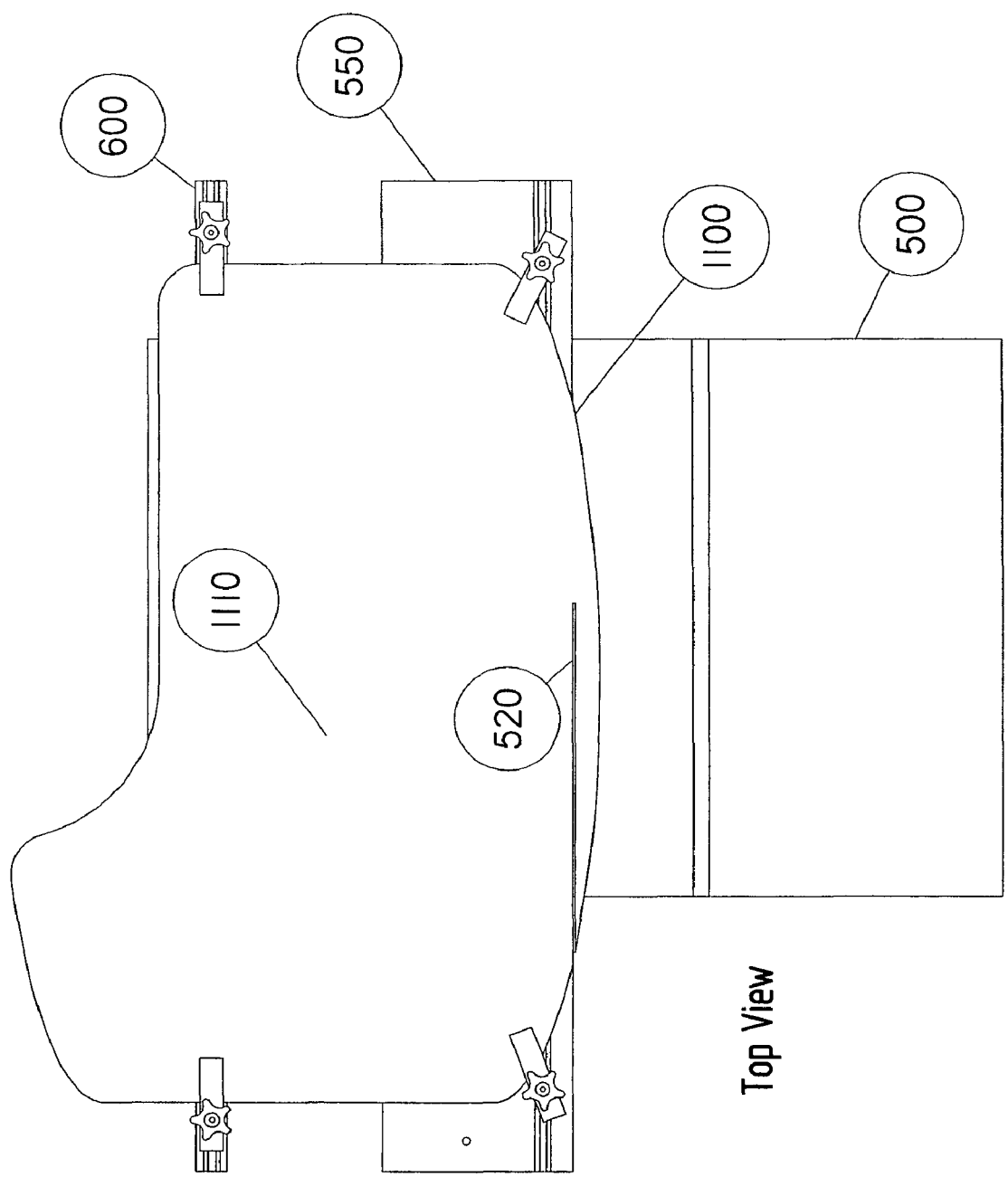
FIG. 11 illustrates an example of making a straight-line cut to a large, irregular shaped workpiece with the invention.

FIGS. 6A, 6B, and 6C illustrate a secondary support component 600 that is used for larger size workpieces where the center of mass of the workpiece is beyond the footprint of the main support component 100 as shown by 1110 in FIG. 11. If a larger size workpiece, as mentioned, were to not be supported beyond its center of mass, it would tilt along the edge of the main support component 100. This would lift up the opposite side of the device and workpiece causing a potential safety problem and reducing the quality of the cut. Using the secondary support component 600 provides the necessary support to avoid this problem. The secondary support component 600 is constructed similarly to the t-shaped channel and clamps portion of the main support component 100. In usage of the secondary support component 600, the bottom surface 630 would be positioned on top of a cutting tool's table surface 510 of FIG. 5, and a workpiece would be placed on the top surface 620. The clamps 610 connect to the secondary support component 600 using the t-shaped track (or channel) 640 on the top surface 620. The preferred embodiment of the invention is illustrated with t-shaped tracks for both the main support component 100 of FIG. 1A and the secondary support component 600; however, the desired functionality can also be achieved from a t-shaped channel directly cut into the top surfaces, 160 and 620 respectively, of these components. The clamps 610 are any one of the clamps that are commonly available in the market for usage with a t-shaped track (or channel). As was explained with the main support component 100, the clamps 610 of the secondary support component 600 function in the same way. They are moveable along the entire length of the t-shaped channel 640 of the secondary support component 600. The clamps 610 hold the workpiece by applying compressive pressure to the top and bottom surfaces of the workpiece. This is achieved by tightening the knobs of the clamps 610. If positioned properly on the work piece, the secondary support component 600 will provide the overall support needed to make the desired cut on a large workpiece without a tilting problem occurring. For a large workpiece which require the usage of the secondary support component 600, the cutting tool's table surface 510 must be of adequate size to provide a surface for the component to ride upon; otherwise, another means of similar support would need to be provided.

Figure 7:
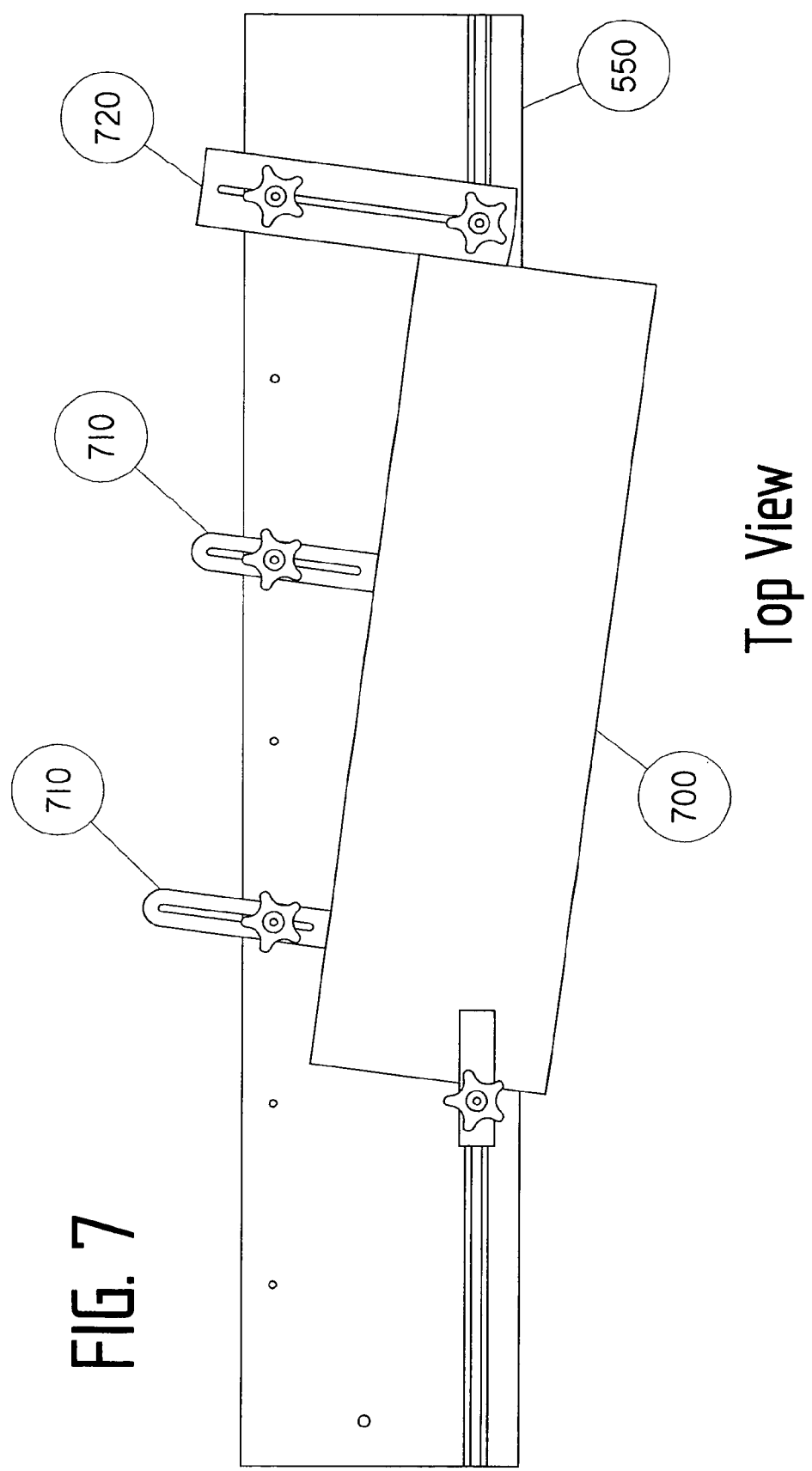
FIG. 7 illustrates an example of the usage of workpiece stops with the invention.

FIG. 7 illustrates an example of the usage of workpiece stops 710 and a fence 720 with the main tool 550 supporting a workpiece 700. The flexibility of the t-shaped channel 130 and threaded holes 140 from FIG. 1A in conjunction with commonly available (or readily fabricated) accessory components provide the ability to consistently position a workpiece for cutting a straight-line in a multitude of different arrangements. Any person of ordinary skill in the art would appreciate the potential configurations that can be set up and used to cut a workpiece with the preferred embodiment of the invention.

Figure 8:
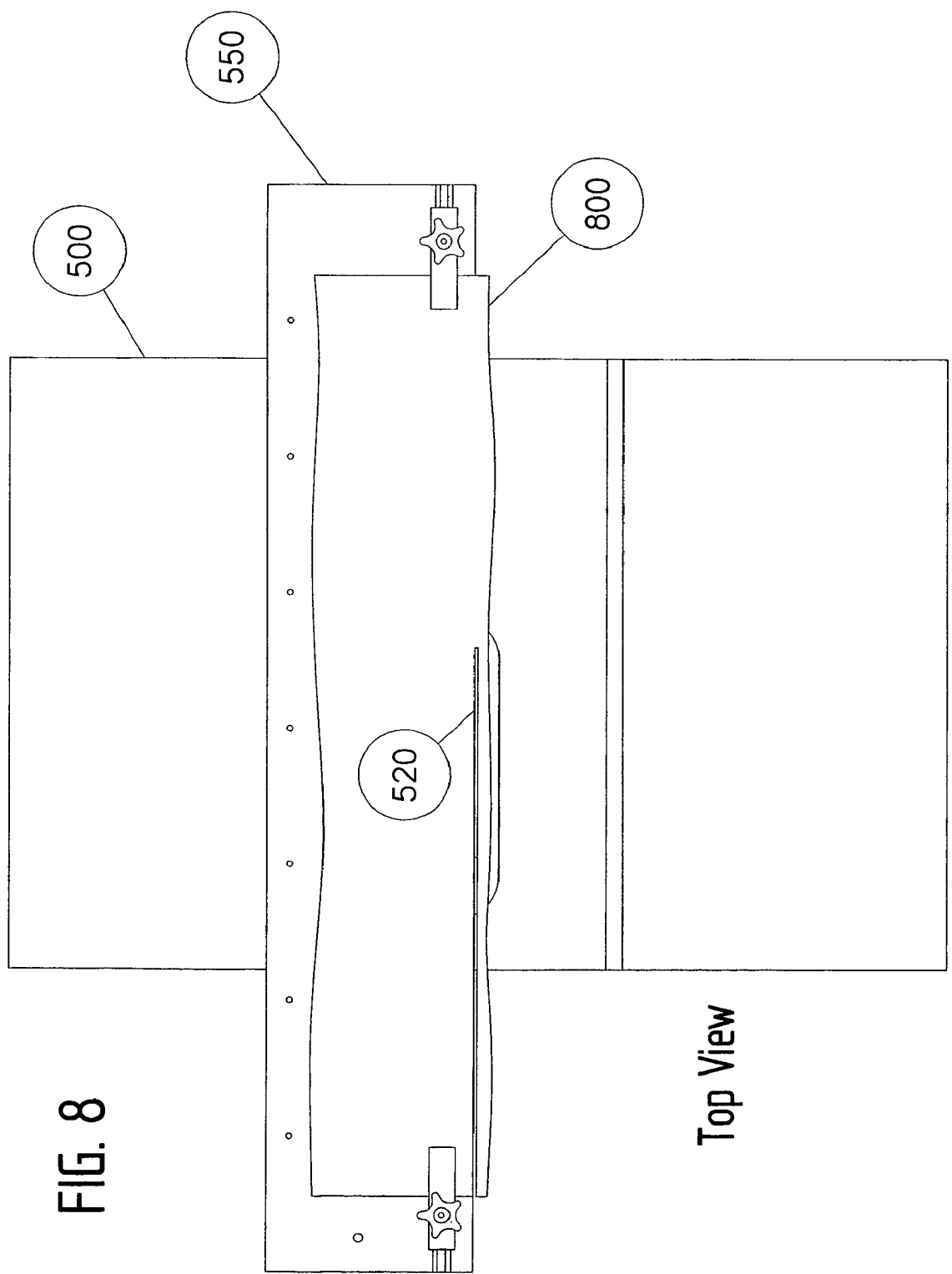
FIG. 8 illustrates an example of making an edge cut to a workpiece with the invention.
Figure 9:
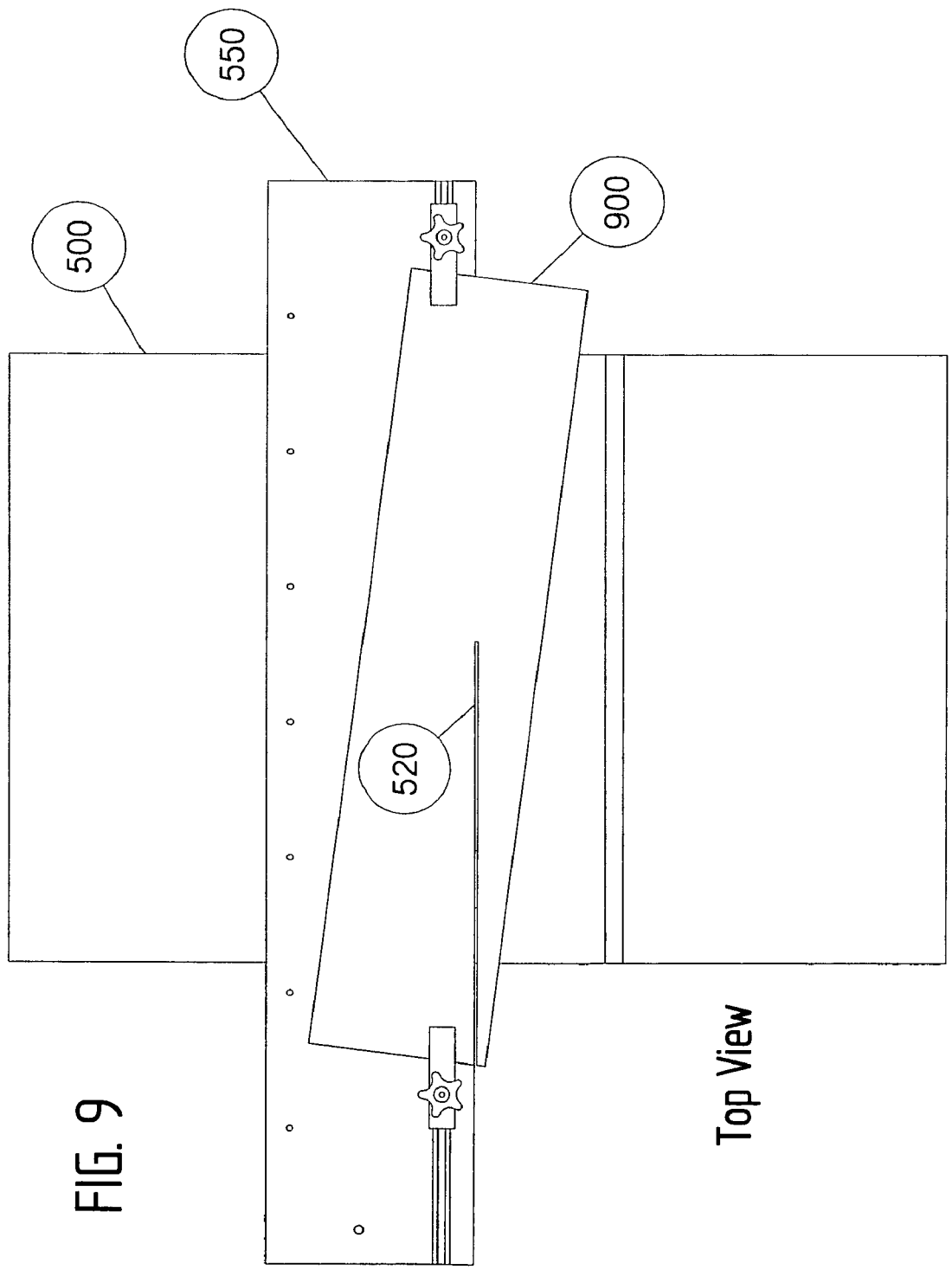
FIG. 9 illustrates an example of making a taper cut to a workpiece with the invention.
Figure 10:
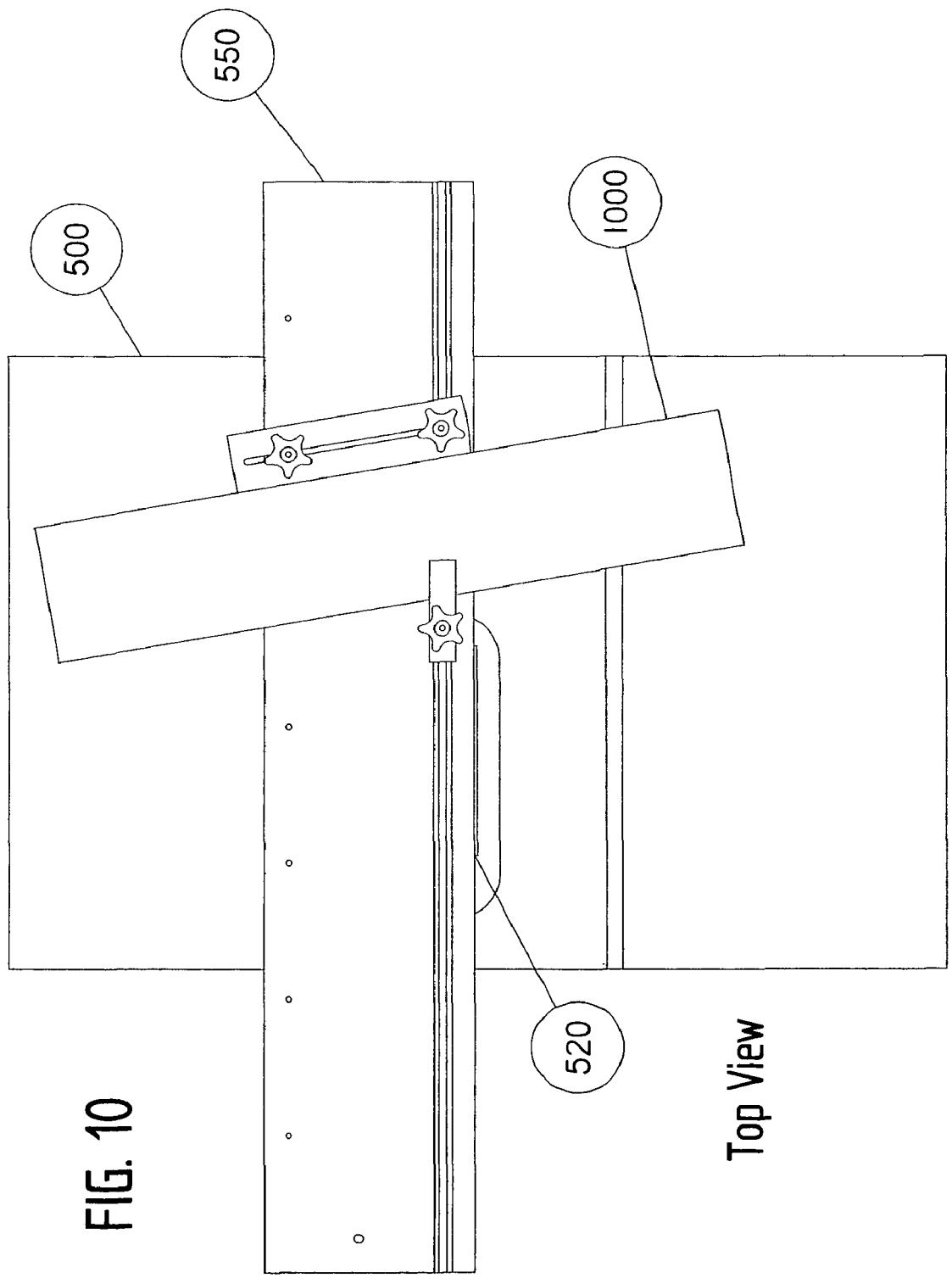
FIG. 10 illustrates an example of making a miter cut to rectangular shaped workpiece with the invention.

FIGS. 8-11 illustrate some of the possible cuts that can be made to various workpieces using the main tool 550 of the preferred embodiment of the invention: edge cut (FIG. 8), taper cut (FIG. 9), and miter cut (FIG. 10). It is important to understand that the tool is not limited to just these particular cuts. Furthermore, it is not limited to being used on only a table saw 500 as shown. Different embodiments of the invention could be used on other cutting tool table surfaces such as a band saw or router. FIG. 8 shows an example of a setup configuration with the main tool 550 for edge cutting a wooden board 800 with its top and bottom sides surfaced (planed and parallel to each other) on a conventional table saw 500. The workpiece 800 is clamped into position to secure it to the main tool 550. Saw blade 520 creates a precise and quality cut with full support along the length of the cut on the workpiece due to the zero clearance gap established between the saw blade and the main tool 550. In this common process of creating a straight edge on one side of a board, the operator merely needs to position one of the two rough edges of the semi-finished board 800 just beyond the zero clearance edge of the main tool 550. The board will then be cut precisely along this edge. This allows the operator to easily see and control how much material will be removed to establish the straight edge.

In FIG. 9, a workpiece 900 is set up for a taper cut on a table saw 500 using the main tool 550. In this example, the workpiece is marked with a line where the taper cut is desired. The workpiece is then positioned on the main tool 550 such that the marked line coincides with the edge of the tool. The workpiece is then clamped into position, and the cutting plane of the saw blade 520 will cut precisely along the desired line. This method of marking the workpiece and lining it up with the tool edge can be used instead of using work stops and/or fence setup configurations. One possible configuration is illustrated in FIG. 7. When a work piece 1100 is substantially larger than the main tool 550 as shown in FIG. 11, this method of marking and setting up the work piece would be the likely choice of an operator. FIG. 11 also illustrates the usage the secondary support 600 with the main tool 550 of the preferred embodiment of the invention. As mentioned previously, since the center of mass 1110 of the workpiece 1100 extends beyond the main tool's edge, the secondary support 600 is needed for proper support. Once the workpiece is properly clamped into position, the saw blade 520 of the table saw 500 precisely cuts the desired straight-line.

FIG. 10 illustrates an example of a setup for making a miter cut. Although a miter cut is shown, a cross cut could also be made just as easily with an adjustment to the same basic setup. In FIG. 10, a workpiece 1000 is positioned against an adjustable fence 720 which is secured to the main tool 550. The workpiece can be clamped into position if desired, or it can be held in place by the operator similarly to using a conventional table sled. The main tool 550 slides upon the table surface of the cutting tool 500 parallel to the cutting plane of the saw blade 520. A miter cut is then precisely cut with full support to the workpiece.

The preferred embodiment of the invention has been described in detail throughout this section. It should be clear to anyone skilled in the art that the specific embodiment and setup configurations put forth can be easily constructed and practiced. Furthermore, these specific forms of the invention do not limit the other possible embodiments that can also be put forth without departing from the spirit and scope of the invention. Compared to the known prior art, the invention provides an improved means for cutting a straight-line in a plurality of angles and positions on a wide range of workpieces of different sizes and shapes with accuracy, consistency, and safety.

What is claimed with this invention is:

1. A fixture to support a workpiece for use with a working surface of a cutting tool having a straight guide slot of uniform width enabling a straight line cut to be achieved, the cutting tool having a blade that extends from the working surface; said fixture comprising:

a main support component having an elongated rectangular panel shape with a top surface with channel along the longitudinal axis of the panel for engaging one or more clamps for supporting a workpiece and a bottom surface with an elongated rectangular channel for engaging a slide component for linear movement along the slide component;

said slide component having an elongated rectangular panel shape which mates with said bottom surface channel of said main support component; a bar member with an elongated rectangular shape and tapered ends affixed to the bottom surface of said slide component; wherein said bar member mates with the guide slot of the working surface a pair of wedge components having an end with a tapered shape that matches the tapered ends of said bar member, wherein said pair of wedge components wedge the corresponding ends of the bar member to lock the bar member into the guide slot of the cutting tool and said slide component to the working surface;

a secondary support component having a narrow elongated rectangular panel shape with a top surface with a channel along the longitudinal axis of the narrow elongated rectangular panel for engaging one or more clamps for supporting a workpiece; said secondary support component being slidably engageable with the top surface channel;

wherein said main support component supports a workpiece to be cut on the top surface as said main support component slides along the slide component towards the cutting tool.

2. The fixture as recited in claim 1, wherein the channel of the main support is t-shaped and comprising clamps movable along the entire length of said t-shaped channel to hold the workpiece in position.

3. The fixture as recited in claim 1, wherein the bar member is located along the width of said slide component.

4. The fixture as recited in claim 1, wherein said pair of wedge components are pressed alongside the tapered ends of said bar member to increase the width on each end, and where the longitudinal axis of the slide component is parallel to the cutting plane of the cutting tool.

5. The fixture as recited in claim 1, wherein the width of said main support component allows the edge of the main support component to be trimmed by the cutting tool to create a zero clearance gap between the cutting plane and the edge of the main support component.

6. The fixture as recited in claim 1, wherein the main support component has a plurality of threaded holes arranged along the top surface engageable with workpiece stops and/or a workpiece fence to position a workpiece in a plurality of arrangements.

7. The fixture as recited in claim 1, wherein said secondary support component is removable from said main support component.

8. The fixture as recited in claim 1, wherein said main support component, slide component, secondary support component and wedge components each have a hole that provides a means of storing the respective components when not in use; wherein the hole of said main support component matches the position of the hole of said slide component when the main support and slide components are assembled in the bottom channel so that the components can be stored together, compactly.

* * * * *